US008742285B2

(12) United States Patent
Hartvigsen et al.

(10) Patent No.: US 8,742,285 B2
(45) Date of Patent: Jun. 3, 2014

(54) METHOD OF OXIDATION UTILIZING A GLIDING ELECTRIC ARC

(71) Applicant: Ceramatec, Inc., Salt Lake City, UT (US)

(72) Inventors: Joseph J. Hartvigsen, Kaysville, UT (US); Elangovan, South Jordan, UT (US); Michele Hollist, South Jordan, UT (US); Piotr Czernichowski, Layton, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 0 days.

(21) Appl. No.: 13/911,181

(22) Filed: Jun. 6, 2013

(65) Prior Publication Data

US 2013/0277355 A1 Oct. 24, 2013

Related U.S. Application Data

(62) Division of application No. 11/777,242, filed on Jul. 12, 2007.

(60) Provisional application No. 60/807,363, filed on Jul. 14, 2006.

(51) Int. Cl.
*B23K 10/00* (2006.01)

(52) U.S. Cl.
USPC ............ 219/121.59; 219/121.36; 219/121.52; 588/900; 110/346

(58) Field of Classification Search
CPC ................................. B23K 10/00; H05H 1/48
USPC ............ 219/121.36, 121.51, 121.59, 121.38, 219/121.53; 110/250, 346, 236; 588/320, 588/900
See application file for complete search history.

(56) References Cited

U.S. PATENT DOCUMENTS

| | | | |
|---|---|---|---|
| 3,159,765 | A | 12/1964 | Schultz |
| 3,863,107 | A | 1/1975 | Mogensen et al. |
| 3,920,417 | A | 11/1975 | Fernandez |
| 3,974,108 | A | 8/1976 | Staut et al. |
| 4,141,694 | A | 2/1979 | Camacho |
| 4,144,444 | A | 3/1979 | Dementiev et al. |

(Continued)

FOREIGN PATENT DOCUMENTS

| | | |
|---|---|---|
| CA | 1059065 | 7/1979 |
| CH | 378296 | 6/1964 |

(Continued)

OTHER PUBLICATIONS

Mayekar, K. "PCT International Search Report for PCT/US98/00393 sent May 4, 1995", (May 4, 1995),1-4.

(Continued)

*Primary Examiner* — Mark Paschall
(74) *Attorney, Agent, or Firm* — David Fonda

(57) ABSTRACT

A method for oxidizing a combustible material. The method includes introducing a volume of the combustible material into a plasma zone of a gliding electric arc oxidation system. The method also includes introducing a volume of oxidizer into the plasma zone of the gliding electric arc oxidation system. The volume of oxidizer includes a stoichiometrically excessive amount of oxygen. The method also includes generating an electrical discharge between electrodes within the plasma zone of the gliding electric arc oxidation system to oxidize the combustible material.

20 Claims, 8 Drawing Sheets

(56) References Cited

U.S. PATENT DOCUMENTS

| | | | | |
|---|---|---|---|---|
| 4,198,590 | A | 4/1980 | Harris | |
| 4,361,441 | A | 11/1982 | Tylko | |
| 4,485,334 | A | 11/1984 | de Witte | |
| 4,580,505 | A | 4/1986 | Golden | |
| 4,588,850 | A | 5/1986 | Mueller et al. | |
| 4,606,799 | A | 8/1986 | Pirklbauer et al. | |
| 4,640,023 | A | 2/1987 | Mori et al. | |
| 4,661,763 | A | 4/1987 | Ari et al. | |
| 4,861,446 | A | 8/1989 | Blom et al. | |
| 4,934,283 | A | 6/1990 | Kydd | |
| 5,043,636 | A | 8/1991 | Klopotek et al. | |
| 5,339,754 | A | 8/1994 | Lyon | |
| 5,376,332 | A | 12/1994 | Martens et al. | |
| 5,399,829 | A | 3/1995 | Ogilvie | |
| 5,460,792 | A | 10/1995 | Rosenbaum | |
| 5,492,777 | A | 2/1996 | Isenberg et al. | |
| RE35,219 | E * | 4/1996 | Kent | 110/246 |
| 5,711,859 | A | 1/1998 | Caramel et al. | |
| 5,993,761 | A | 11/1999 | Czernichowski et al. | |
| 6,007,742 | A * | 12/1999 | Czernichowski et al. | 252/372 |
| 6,152,050 | A | 11/2000 | Tsantrizos et al. | |
| 6,546,883 | B1 * | 4/2003 | Fink et al. | 110/238 |
| 6,810,821 | B2 | 11/2004 | Chan | |
| 6,924,608 | B2 | 8/2005 | Czernichowski et al. | |
| 7,089,745 | B2 | 8/2006 | Roby et al. | |
| 7,299,756 | B2 | 11/2007 | Gnedenko et al. | |
| 7,459,594 | B2 | 12/2008 | Czernichowski et al. | |
| 7,588,746 | B1 | 9/2009 | Muradov et al. | |
| 7,621,225 | B2 * | 11/2009 | Walker et al. | 110/229 |
| 7,832,344 | B2 * | 11/2010 | Capote et al. | 110/250 |
| 7,973,262 | B2 | 7/2011 | Matveev | |
| 2001/0020582 | A1 | 9/2001 | Barankova et al. | |
| 2002/0185487 | A1 | 12/2002 | Divakar et al. | |
| 2003/0024806 | A1 | 2/2003 | Foret | |
| 2004/0065259 | A1 | 4/2004 | Inazumachi et al. | |
| 2005/0269978 | A1 | 12/2005 | Czernichowski et al. | |
| 2006/0016471 | A1 | 1/2006 | Greiff | |
| 2006/0018823 | A1 | 1/2006 | Czernichowski et al. | |
| 2006/0144305 | A1 * | 7/2006 | Vera | 110/250 |
| 2006/0154189 | A1 | 7/2006 | Ramotowski et al. | |
| 2006/0234100 | A1 | 10/2006 | Day et al. | |
| 2006/0279290 | A1 | 12/2006 | Swenson et al. | |
| 2007/0186474 | A1 | 8/2007 | Rabovitser et al. | |
| 2007/0254966 | A1 | 11/2007 | Eskin et al. | |
| 2008/0041829 | A1 * | 2/2008 | Blutke et al. | 219/121.36 |
| 2009/0056222 | A1 | 3/2009 | Gutsol et al. | |
| 2009/0056604 | A1 | 3/2009 | Hartvigsen et al. | |
| 2009/0100752 | A1 | 4/2009 | Sessa et al. | |
| 2009/0119994 | A1 | 5/2009 | Johnson et al. | |
| 2010/0266908 | A1 | 10/2010 | de Graffenried, Sr. | |
| 2012/0118862 | A1 | 5/2012 | Hartvigsen et al. | |

FOREIGN PATENT DOCUMENTS

| | | |
|---|---|---|
| EP | 0601797 | 6/1994 |
| FR | 374278 | 6/1907 |
| FR | 2049269 | 3/1971 |
| FR | 2593493 | 7/1987 |
| FR | 2639172 | 5/1990 |
| FR | 2689116 | 10/1993 |
| FR | 2724806 | 3/1996 |
| FR | 2775864 | 9/1999 |
| FR | 2873306 | 1/2006 |
| GB | 2172011 | 9/1986 |
| GB | WO-PCT/GB94/01818 | 3/1995 |
| JP | 5828186 | 2/1983 |
| JP | 5508830 | 8/1992 |
| JP | 6016471 | 1/1994 |
| JP | 8150315 | 6/1996 |
| JP | 9276691 | 10/1997 |
| JP | 01514150 | 9/2001 |
| JP | 2003251176 | 9/2003 |
| JP | 2004339557 | 12/2004 |
| PL | 172152 | 7/1995 |
| PL | 196319 | 1/2003 |
| RO | 112225 | 6/1997 |
| WO | WO-9212929 | 8/1992 |
| WO | WO-9426656 | 11/1994 |
| WO | WO-9506225 | 3/1995 |
| WO | WO-9911572 | 3/1999 |
| WO | WO-2011119274 | 9/2011 |

OTHER PUBLICATIONS

Nave, "Office Action for U.S. Appl. No. 09/005,647 sent Jan. 13, 1999", (Jan. 13, 1999),1-7.

Alemu, "Office Action for U.S. Appl. No. 09/995,125 sent May 7, 2003", (May 7, 2003),1-6.

Bijn, E. "PCT International Search Report for PCT/US01/44307 sent May 17, 2002", (May 17, 2002),1-5.

Lesueur, et al., "Abstract of FR2639172", (Dec. 10, 2007),1.

Czernichowski, et al., "Abstract of FR2775864", (Dec. 10, 2007),1.

Bacchi, et al., "Esp@cenet automated translation of description and claims of FR2049269", (Dec. 10, 2007),3.

Meguernes, K. et al., "Oxidization of CH4 by H20 in a gliding electric arc", 3rd European Congress on Thermal Plasma Processes, Aachen, Germany, Sep. 19-21, 1994, abstract No. 80; full text in VDI Berichte 1166,(1995),495-500.

Clement, J-P "PCT International Search Report for PCT/US98/18027 sent Jan. 4, 1999", (Jan. 4, 1999),1-5.

Lesueur, et al., "Electrically Assisted Partial Oxidation of Methane", *Int. J. Hydrogen Energy*, vol. 19, No. 2,(1994),139-144.

Czernichowski, et al., "Abstract of FR2724806", *DialogWeb DERWENT database search results for English-language*, printed on Jan. 25, 1999, (Mar. 22, 1996),1-2.

Nave, "Office Action for U.S. Appl. No. 09/144,318 sent Mar. 17, 1999", (Mar. 17, 1999),1-10.

Petit, "PCT Written Opinion for PCTUS9818027 sent Jul. 16, 1999", (Jul. 16, 1999),1-4.

Alemu, "Office Action for U.S. Appl. No. 11/186,711 sent Aug. 8, 2006", (Aug. 8, 2006),1-6.

Alemu, "Office Action for U.S. Appl. No. 11/186,711 sent Mar. 27, 2007", (Mar. 27, 2007),1-6.

Alemu, "Office Action for U.S. Appl. No. 11/186,711 sent Feb. 7, 2006", (Feb. 7, 2006),1-6.

Karl, et al., "Esp@cenet automated translation of Description and Claims of CH378296", (Dec. 10, 2007),1-4.

Jorgensen, et al., "Abstract of FR2593493", (Dec. 10, 2007),1.

Copenheaver, B. R., "International Search Report for PCT/US07/16050 sent Mar. 4, 2008", (Mar. 4, 2008),1-2.

Copenheaver, B. R., "Written Opinion for PCT/US07/16050 sent Mar. 4, 2008", (Mar. 4, 2008),1-5.

Hartvigsen, et al., "U.S. Appl. No. 11/777,900, filed Jul. 13, 2007", (Jul. 13, 2007),1-30.

Hartvigsen, et al., "U.S. Appl. No. 12/036,170, filed Feb. 22, 2008", (Feb. 22, 2008),1-31.

Hartvigsen, et al., "U.S. Appl. No. 11/777,242, filed Jul. 12, 2007", (Jul. 12, 2007),1-30.

Kanda, Kazuki "Translation of Japanese Office Action", JP App. No. 2009-550921, (Aug. 2, 2011),1-15.

Gallagher, Michael et al., "Partial Oxidation and Autothermal Reforming of Heavy Hydrocarbon Fuels with Non-Equilibrium Gliding Arc Plasma for Fuel Cell Applications", *Thesis submitted to Drexel University*, Phil., PA, (Feb. 1, 2010),1-175.

Raju, Arun et al., "Synthesis Gas Production Using Steam Hydrogasification and Steam Reforming", *Fuel Processing Technology 90*, (2009),330-336.

Van Dyk, J. C., et al., "Syngas Production From South African Coal Sources Using Sasol-Lurgi Gasifiers", *International Journal of Coal Geology 65*, Available online Aug. 11, 2005,(2006),243-253.

Strait, Megan et al., "Synthesis Gas Reformers", http://www.owlnet.rice.edu/~ceng403/nh3ref97.html , Rice University, (1997),1-6.

Lewis, Stan "Search Report", *National Patent Services Search Report*, Arlington VA, (Jan. 4, 2012),1-3.

Czernichowski, et al., "English Language Abstract", FR 2873306, (Jan. 27, 2006),1-2.

(56) References Cited

OTHER PUBLICATIONS

Paschall, Mark H., "Non Final Office Action", U.S. Appl. No. 11/777,242, (May 23, 2012),1-6.
Nakamura, Norio "English Translation of Notice of Reasons for Rejection", JP App. No. 2009-5419556 (Corresponding to U.S. Appl. No. 11/777,242), (May 15, 2012),1-3.
Yoshinaka, Satoru "English Language Abstract of JP 8150315", (Jun. 11, 1996),1-2.
Abe, et al., "English Language Abstract of JP 9276691", (Oct. 28, 1997),1-2.
Young, Lee W., "International Search Report", PCT US 07/16049 (Corresponding to U.S. Appl. No. 11/777,242), (Jul. 25, 2008),1-2.
Young, Lee W., "Written Opinion of the International Searching Authority", PCT US 07/16049 (Corresponding to U.S. Appl. No. 11/777,242, (Jul. 25, 2008),1-5.
Besana, S "Communication Pursuant to Article 96(2) EPC", EP App. No. 98903417.8 (Corresponding to U.S. Appl. No. 09/005,647), (Feb. 5, 2001),1-5.
Clement, J-P "Supplementary European Search Report", EP App. No. 98903417.8 (Corresponding to U.S. Appl. No. 09/005,647), (Mar. 2, 1999),1-2.
Schwob, Yvan "English Language Abstract", FR 2689116, (Oct. 1, 1993),1.
Pham, Thi T., "Notice of Requisition", CA. App. No. 2300962 (Corresponding to U.S. Appl. No. 09/144,318, (Oct. 9, 2003),1-4.
Petit, B L., "Communication Pursuant to Article 96(2) EPC", EP App. No. 98943485.7 (Corresponding to U.S. Appl. No. 09/144,318), (Oct. 9, 2001),1-3.
Petit, B L., "Communication Pursuant to Article 96(2) EPC", EP App. No. 98943485.7 (Corresponding to U.S. Appl. No. 09/144,318), (Feb. 25, 2003),1-3.
Deczky, Kristina "Notice of Requisition", CA App. No. 2429533 (Corresponding to U.S. Appl. No. 09/995,125), (Oct. 14, 2008),1-3.
Bodnar, Kristina "Notice of Requisition", CA App. No. 2429533 (Corresponding to US Appl. No. 09/995,125), (Jul. 30, 2009),1-3.
Bijn, Eric "Communication Pursuant to Article 94(3) EPC", EP App. No. 01990722.9 (Corresponding to U.S. Appl. No. 09/995,125), (Apr. 3, 2009),1-3.
Bijn, Eric "Communication Pursuant to Article 96(2) EPC", EP App. No. 01990722.9 (Corresponding to U.S. Appl. No. 09/995,125), (Apr. 17, 2007),1-4.
Bijn, Eric "Communication Pursuant to Article 94(3) EPC", EP App. No. 01990722.9 (Corresponding to U.S. Appl. No. 09/995,125), (Jul. 26, 2011),1-4.
Alemu, Ephrem "International Preliminary Examination Report", PCTUS01/044307 (Corresponding to U.S. Appl. No. 09/995,125, (Oct. 13, 2003),1-4.
Unknown JP Patent Appeal Judge, "Translation of Appeal Judges Reasons for Rejection", JP App. No. 545028/02 (Corresponding to U.S. Appl. No. 09/995,125), (Feb. 15, 2010),1-9.
Unknown Japanese Patent Examiner, "Translation of Examiner's Reasons for Rejection", JP App. No. 545028/02 (Corresponding to U.S. Appl. No. 09/995,125), (Feb. 13, 2006),1-3.
Unknown Japanese Patent Examiner, "Translation of Final Rejection", JP App. No. 545028/02 (Corresponding to U.S. Appl. No. 09/995,125), (Oct. 27, 2006),1-3.
Unknown JP Patent Appeal Judge, "Translation of Appeal Judges Reasons for Rejection", JP App. No. 545028/02 (Corresponding to US Appl. No. 09/995,125), (Apr. 22, 2009),1-2.
Laux, David J., "Non Final Office Action", U.S. Appl. No. 11/777,900, (Mar. 11, 2010),1-10.
Laux, David J., "Final Office Action", U.S. Appl. No. 11/777,900, (Jul. 28, 2010),1-11.
Pert, Evan T., "Non Final Office Action", U.S. Appl. No. 12/036,170, (Feb. 29, 2012),1-17.
Young, Lee W., "International Search Report", PCT US 08/002334 (Corresponding to U.S. Appl. No. 12/036,170, (Jun. 25, 2008),1-2.
Young, Lee W., "Written Opinion of the International Searching Authority", PCT US 08/002334 (Corresponding to U.S. Appl. No. 12/036,170), (Jun. 25, 2008),1-6.
Hirayama, et al., "Japanese Publication No. 06-016471 (Translation)", Automated English Translation of JP 06-016471, (Jan. 25, 1994),1-6.
Tamaru, et al., "Japanese Publication No. 2003251176 (Translation)", Automated English Translation of JP 2003-251176, (Sep. 9, 2003),1-10.
Okumura, et al., "Japanese Publication No. 2004-339557 (Translation)", Automated Translation of JP 2004-339557, (Dec. 2, 2004),1-16.
Espacenet, "Bibliographical Data: JP58028186", Bibliographical Data for JP 58028186, (relating US patent No. 4485334 as a corresponding document to JP 58028186),(Feb. 19, 1983),1.
Nakamura, Norio "English Translation of Notice of Reasons for Rejection", JP App. No. 2009-519556 (corresponding to U.S. Appl. No. 11/777,242), (Feb. 26, 2013),1-7.
Nakamura, Norio "Notice of Reasons for Rejection", JP App. No. 2009-519556 (Corresponding to U.S. Appl. No. 11/777,242), (Feb. 26, 2013),1-4.
Unknown, "JPO Computer Translation", Japanese Patent Publication JP 06-017062, (Jan. 25, 1994),1-3.
Kawashima, Tsutomu "Espacenet English Abstract and Bibliographical Data", Japanese Patent Publication JP06-17062, (Jan. 25, 1994),1.

* cited by examiner

METHOD OF OXIDATION UTILIZING A GLIDING ELECTRIC ARC

CROSS-REFERENCE TO RELATED APPLICATIONS

This application is a divisional of, and claims priority to, U.S. patent application Ser. No. 11/777,242, filed on Jul. 12, 2007, which claims benefit to U.S. Provisional Patent Application No. 60/807,363, filed on Jul. 14, 2006. These provisional and non-provisional patent applications are expressly incorporated herein by reference in their entirety.

BACKGROUND

The use of a safe, complete, and environmentally benign process is useful in the disposal of chemical weapons (CW) stockpile. The conventional method of disposal uses incineration technology. However, conventional incineration technology faces legal, social, and political obstacles.

The conventional incineration process produces a large volume of off gas, which is further treated with pollution abatement equipment such as a quench tower, a scrubber, a demister, and a baghouse for particulate removal. Hence, incineration plants are not suitable for mobile units. Additionally, incineration plants are typically housed in a building such as a facility relatively close to the stockpile, creating inherent risks for personnel who work at the facility. Alternatively, dangerous stockpile chemicals are transported from the stockpile to the incineration facility, creating risks related to potential transportation accidents.

As a result of the incineration process, harmful dioxins are produced due to poor mixing and short residence time at the operating temperature, as well as prolonged exposure at temperatures that favor the formation of dioxins. The production of dioxins presents a major environmental challenge.

Neutralization is an alternative technology for the destruction of toxic chemicals. However, the neutralization process has been abandoned by the U.S. Army due to its complexity, more problematic waste produced by the process, cost, and analytical problems in certifying the treated waste as agent-free.

Conventional plasma arc technology has also been evaluated for the destruction of such waste. Using conventional plasma arc technology, waste is atomized in a high temperature (e.g., 5,000° C. to 15,000° C.) pyrolysis chamber. The resulting gases are scrubbed and combusted with air. While this process is amenable to a transportable unit, the primary limitation is the high temperature requires high power input and forms undesirable products, as explained above.

SUMMARY

Embodiments of a method are described. In one embodiment, the method is a method for oxidizing a combustible material. An embodiment of the method includes introducing a volume of the combustible material into a plasma zone of a gliding electric arc oxidation system and introducing a volume of oxidizer into the plasma zone of the gliding electric arc oxidation system. The volume of oxidizer includes a stoichiometrically excessive amount of oxygen. The method also includes generating an electrical discharge between electrodes within the plasma zone of the gliding electric arc oxidation system to oxidize the combustible material. Other embodiments of the method are also described.

Embodiments of a system are also described. In one embodiment, the system is a system to oxidize a combustible material. An embodiment of the system includes at least one channel to direct the combustible material and an oxidizer into a plasma zone of a plasma generator and an oxygen controller to control an amount of oxygen of the oxidizer into the plasma zone of the plasma generator. The oxygen controller is configured to provide a stoichiometrically excessive amount of oxygen. The system also includes a plurality of electrodes within the plasma zone of the plasma generator. The plurality of electrodes are configured to generate a plasma to oxidize the combustible material. Other embodiments of the system are also described.

Embodiments of an apparatus are also described. In one embodiment, the apparatus is an oxidation apparatus. An embodiment of the oxidation apparatus includes means for introducing a combustible material into a plasma zone of a plasma generator, means for introducing a stoichiometrically excessive amount of oxygen into the plasma zone of the plasma generator, and means for oxidizing substantially all of the combustible material to render a harmful chemical into a safe material for disposal. Other embodiments of the apparatus are also described.

Other aspects and advantages of embodiments of the present invention will become apparent from the following detailed description, taken in conjunction with the accompanying drawings, which are illustrated by way of example of the various principles and embodiments of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Figure 1A:
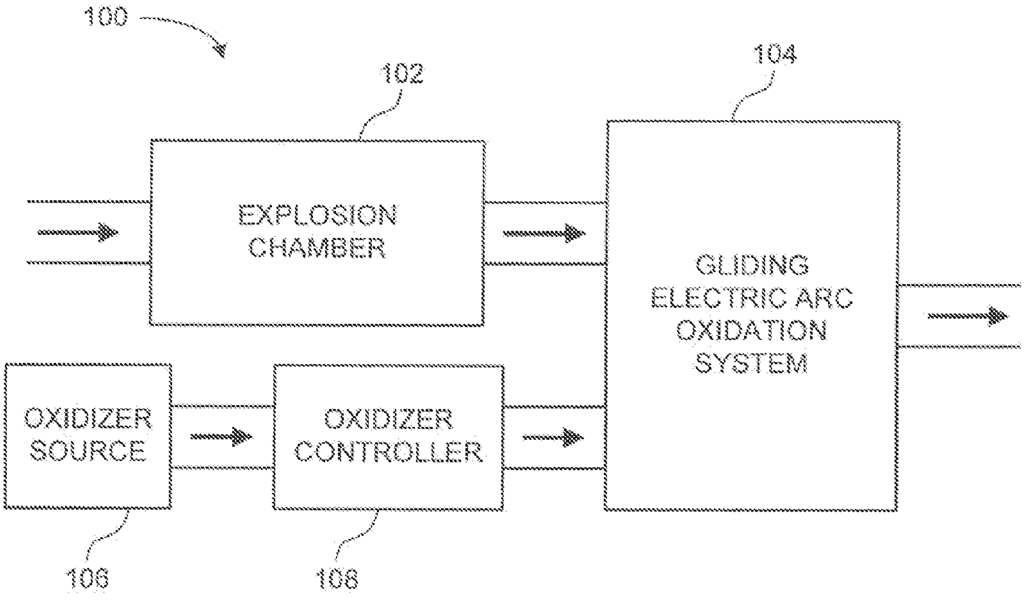
FIG. 1A illustrates a schematic block diagram of one embodiment of an oxidation system for oxidizing a combustible material.

FIG. 1A illustrates a schematic block diagram of one embodiment of an oxidation system 100 for oxidizing a combustible material. The illustrated oxidation system includes an explosion chamber 102, a gliding electric arc oxidation system 104, an oxygen source 106, and an oxygen controller 108. Although certain functionality is described herein with respect to each of the illustrated components of the oxidation system 100, other embodiments of the oxidation system 100 may implement similar functionality using fewer or more components. Additionally, some embodiments of the oxidation system 100 may implement more or less functionality than is described herein.

In one embodiment, a material enters the explosion chamber 102 for incineration, or partial combustion. Incineration of particular materials produces off gases that can be toxic or otherwise harmful to people or the environment. For off gases and other incineration products that are combustible, the oxidation system 100 routes the combustible material from the explosion chamber 102 to the gliding electric arc oxidation system 104. In other embodiments, other types of combustible materials such as synthesis gas (also referred to as syngas) are routed to the gliding electric arc oxidation system 104.

For convenience, references to combustible materials encompass a variety of materials or chemical compositions that may be oxidized by the gliding electric arc oxidation system 104. The combustible material routed to the gliding electric arc oxidation system 104 may be in gas, liquid, or solid form. In one embodiment, the combustible material is a hydrocarbon. In another embodiment, the combustible material is a solid comprising primarily carbon. Additionally, some embodiments of the oxidation system 100 facilitate combining the combustible material with a carrier material. For example, the combustible material may be entrained with a liquid or gaseous carrier material.

It should be noted that some embodiments of the oxidation system 100 exclude the explosion chamber 102. In other words, the gliding electric arc oxidation system 104 may receive the combustible material from another source other than the explosion chamber 102. For example, in some embodiments, the combustible material may be processed directly by the gliding electric arc oxidation system 104, without any prior incineration, combustion, or other processing.

In one embodiment, the gliding electric arc oxidation system 104 is a high energy plasma arc system. Additionally, some embodiments of the gliding electric arc oxidation system 104 are referred to as non-thermal plasma systems because the process employed by the gliding electric arc oxidation system 104 does not provide a substantial heat input for the oxidation reaction.

In order to facilitate the oxidation process implemented by the gliding electric arc oxidation system 104, the oxidizer source 106 supplies an oxidizer, or oxidant, to the gliding electric arc oxidation system 104. In one embodiment, the oxidizer controller 108 controls the amount of oxidizer such as oxygen that is supplied to gliding electric arc oxidation system 104. For example, the oxidizer controller 108 may control the flow rate of the oxidizer from the oxidizer source 106 to the gliding electric arc oxidation system 104. The oxidizer may be air, oxygen, steam ($H_2O$), or another type of oxidizer. Embodiments of the oxidizer controller 108 include a manually controlled valve, an electronically controlled valve, a pressure regulator, an orifice of specified dimensions, or another type of flow controller. Another embodiment of the controller incorporates an oxidant composition sensor feedback system.

In one embodiment, the oxidizer mixes with the combustible material within the gliding electric arc oxidation system 104. Alternatively, the combustible material and the oxidizer may be premixed before the mixture is injected into the gliding electric arc oxidation system 104. Additionally, the oxidizer, the combustible material, or a mixture of the oxidizer and the combustible material may be preheated prior to injection into the gliding electric arc oxidation system 104.

In general, the gliding electric arc oxidation system 104 oxidizes the combustible material and outputs an oxidation product that is free of harmful materials or substantially free of harmful materials. More specific details of the oxidation process are described below with reference to the following figures. It should be noted that the oxidation process depends, at least in part, on the amount of oxidizer that is combined with the combustible material and the temperature resulting from the heat released in the reaction. Partial oxidation, or reformation, of the combustible material produces a reformate product such as syngas. Reformation occurs when the amount of oxygen is less than a stoichiometric amount of oxygen. In some embodiments, 30-40% of stoichiometric oxygen levels are used to implement the reformation process. An exemplary reformation equation is:

$$CH_n + \frac{1}{2}O_2 \rightarrow CO + \frac{n}{2}H_2$$

Another exemplary reformation equation is:

$$CH_n + H_2O \rightarrow CO + \left(1 + \frac{n}{2}\right)H_2$$

In contrast, full oxidation (referred to simply as oxidation) of the combustible material produces an oxidation product. Full oxidation occurs when the amount of oxygen is more than a stoichiometric amount of oxygen. In some embodiments, 5-100% excess of stoichiometric oxygen levels are used to implement the oxidation process. An exemplary oxidation equation is:

$$CH_n + \left(1 + \frac{n}{4}\right)O_2 \rightarrow CO_2 + \frac{n}{2}H_2O$$

Other equations may be used to describe other types of reformation and oxidation processes.

While reformation processes may be endothermic or exothermic, the oxidation process is exothermic. Hence, the reactants used in the oxidation process may not need to be preheated. Nevertheless, it may be useful to maintain part or all of the gliding electric arc oxidation system 104 at an operating temperature within an operating temperature range for efficient operation of the gliding electric arc oxidation system 104. In one embodiment, the gliding electric arc oxidation system 104 is mounted within a furnace (refer to FIGS. 9A and 9B) during operation to maintain the operating temperature of the gliding electric arc oxidation system 100 within an operating temperature range of approximately 700° C. to 1000° C. Other embodiments may use other operating temperature ranges.

Figure 1B:
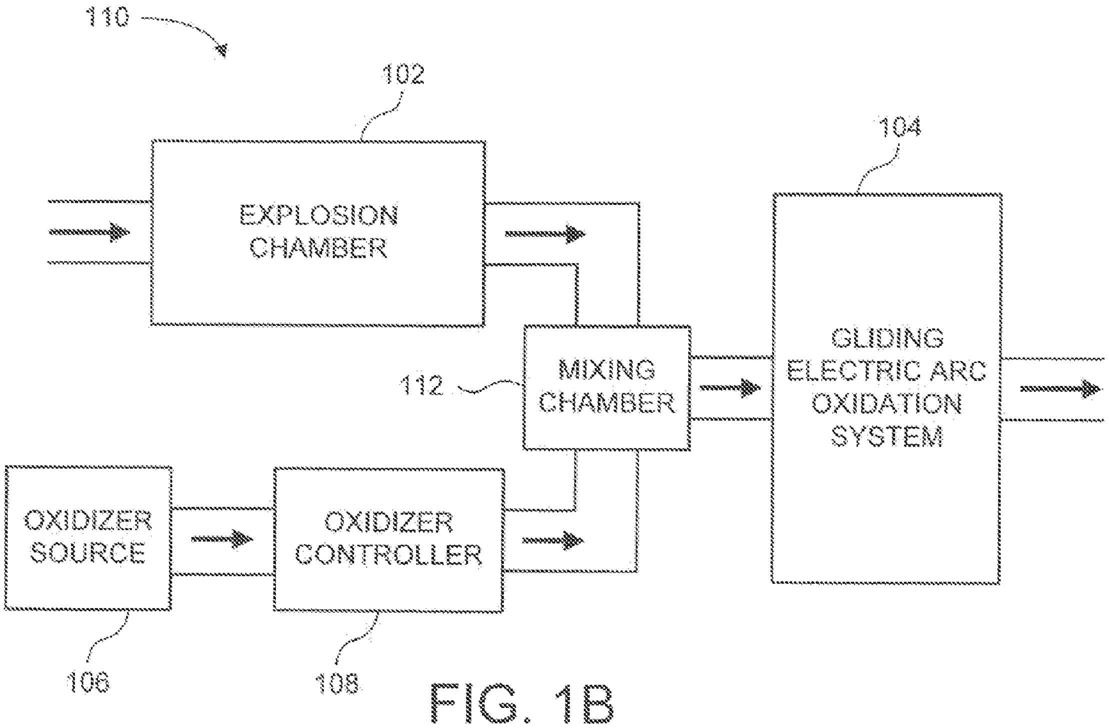
FIG. 1B illustrates a schematic block diagram of another embodiment of an oxidation system for oxidizing a combustible material.

FIG. 1B illustrates a schematic block diagram of another embodiment of an oxidation system 110 for oxidizing a combustible material. Although certain functionality is described herein with respect to each of the illustrated components of the oxidation system 110, other embodiments of the oxidation system 110 may implement similar functionality using fewer or more components. Additionally, some embodiments of the oxidation system 110 may implement more or less functionality than is described herein.

The illustrated oxidation system 110 shown in FIG. 1B is substantially similar to the oxidation system 100 shown in FIG. 1A, except that the oxidation system 110 shown in FIG. 1B also includes a mixing chamber 112. The mixing chamber 112 is coupled between the explosion chamber 102 and the gliding electric arc oxidation system 104. The mixing chamber 112 is also coupled to the oxidizer source 106, for example, via the oxidizer controller 108. In one embodiment, the mixing chamber 112 facilitates premixing the combustible material and the oxidizer prior to introduction into the gliding electric arc oxidation system 104. In some embodiments, the mixing chamber 112 may be a separate chamber coupled to conduits connected to the explosion chamber 104, the gliding electric arc oxidation system 104, and the oxidizer controller 108. In other embodiments, the mixing chamber 112 may be a shared channel, or conduit, to jointly transfer the combustible gas and the oxidizer to the gliding electric arc oxidation system 104.

Figure 2:
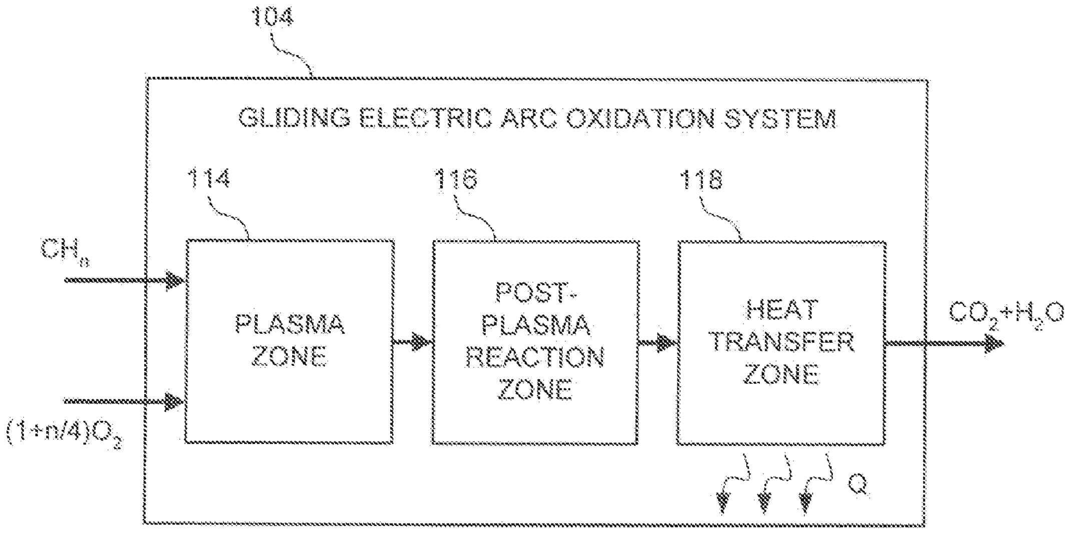
FIG. 2 illustrates a schematic block diagram of one embodiment of the gliding electric arc oxidation system of the oxidation system of FIG. 1A.

FIG. 2 illustrates a schematic block diagram of one embodiment of the gliding electric arc oxidation system 104 of the oxidation system 100 of FIG. 1A. The illustrated gliding electric arc oxidation system 104 includes a plasma zone 114, a post-plasma reaction zone 116, and a heat transfer zone 118. Although three separate functional zones are described, some embodiments may implement the functionality of the various zones at approximately the same time and/or in approximately the same physical proximity. For example, heat transfer corresponding to the illustrated heat transfer zone 118 may occur during plasma generation corresponding to the plasma zone 114. Similarly, heat transfer corresponding to the heat transfer zone 118 may occur in approximately the same location as post-plasma reactions corresponding to the post-plasma reaction zone 116.

In one embodiment, the combustible material (represented by $CH_n$) and the oxidizer (represented by $(1+n/4)O_2$) are introduced into the plasma zone 114, which includes a plasma generator (refer to FIGS. 3A-C) such as a gliding electric arc. The plasma generator acts as a catalyst to initiate the oxidation process. More specifically, the plasma generator ionizes, or breaks apart, one or more of the reactants to create reactive elements.

After ionization, the reactants pass to the post-plasma reaction zone 116, which facilitates homogenization of the oxidized composition. Within the post-plasma reaction zone 116, some of the reactants and the products of the reactants are oxygen rich while others are oxygen lean. A homogenization material such as a solid state oxygen storage compound within the post-plasma reaction zone 116 acts as a chemical buffering compound to physically mix, or homogenize, the oxidation reactants and products. Hence, the oxygen storage compound absorbs oxygen from oxygen-rich packets and releases oxygen to oxygen-lean packets. This provides both spatial and temporal mixing of the reactants to help the reaction continue to completion. In some embodiments, the post-plasma reaction zone 116 also facilitates equilibration of gas species and transfer of heat.

The heat transfer zone 118 also facilitates heat transfer from the oxidation product to the surrounding environment. In some embodiments, the heat transfer zone 118 is implemented with passive heat transfer components which transfer heat, for example, from the oxidation product to the homogenization material and to the physical components (e.g., housing) of the gliding electrical arc oxidation system 104. Other embodiments use active heat transfer components to implement the heat transfer zone 118. For example, forced air over the exterior surface of a housing of the gliding electric arc oxidation system 104 may facilitate heat transfer from the housing to the nearby air currents. As another example, an active stream of a cooling medium may be used to quench an oxidation product.

Figure 3A:
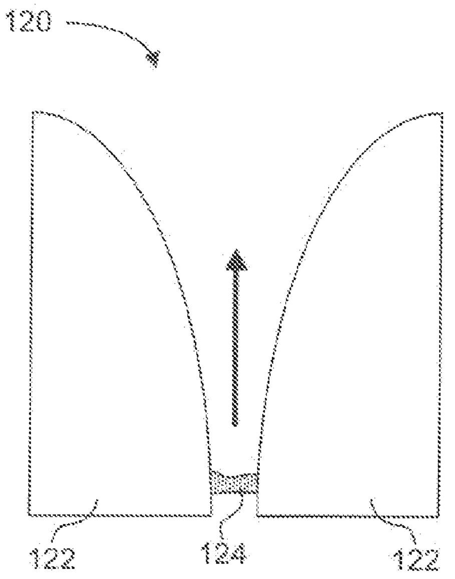
FIGS. 3A-C illustrate schematic diagrams of a plasma generator of the gliding electric arc oxidation system of FIG. 2.
Figure 3B:
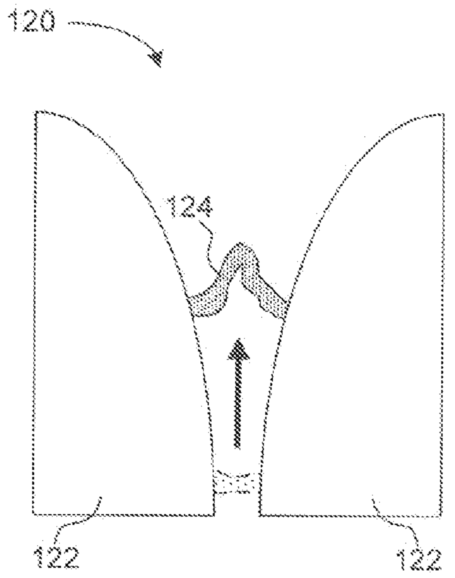
Figure 3C:
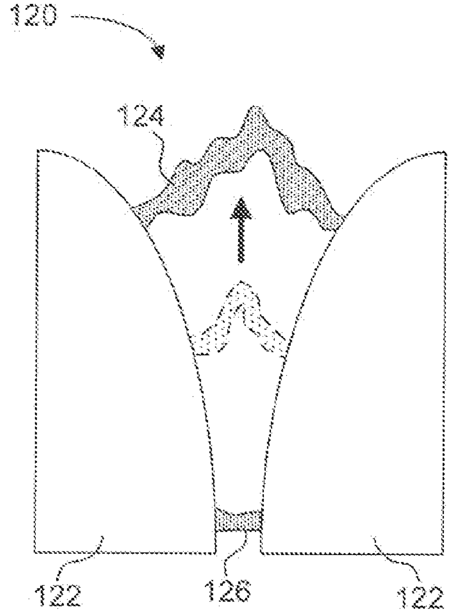

FIGS. 3A-C illustrate schematic diagrams of a plasma generator 120 of the gliding electric arc oxidation system 104 of FIG. 2. The depicted plasma generator 120 includes a pair of electrodes 122. However, other embodiments may include more than two electrodes 122. For example, some embodiments of the plasma generator 120 may include three electrodes 122. Other embodiments of the plasma generator 120 may include six electrodes 122 or another number of electrodes 122. Each electrode 122 is coupled to an electrical conductor (not shown) to provide an electrical signal to the corresponding electrode 122. Where multiple electrodes 122 are implemented, some electrodes 122 may be coupled to the same electrical conductor so that they are on the same phase of a single-phase or a multi-phase electrical distribution system.

The electrical signals on the electrodes 122 produce a high electrical field gradient between each pair of electrodes 122. For example, if there is a separation of 2 millimeters between a pair of electrodes 122, the electrical potential between the electrodes 122 is about 6-9 kV.

The mixture of the combustible material and the oxidizer enters and flows axially through the plasma generator 120 (in the direction indicated by the arrow). The high voltage between the electrodes 122 ionizes the mixture of reactants, which allows current to flow between the electrodes 122 in the form of an arc 124, as shown in FIG. 3A. Because the ions of the reactants are in an electric field having a high potential gradient, the ions begin to accelerate toward one of the electrodes 122. This movement of the ions causes collisions which create free radicals. The free radicals initiate a chain reaction for combustion of the combustible material.

Due to the flow of the mixture into the plasma generator 120, the ionized particles are forced downstream, as shown in FIG. 3B. Since the ionized particles form the least resistive path for the current to flow, the arc 124 also moves downstream (as indicated by the arrow) and spreads out to follow the contour of the diverging edges of the electrodes 122. Although the edges of the electrodes 122 are shown as elliptical contours, other variations of diverging contours may be implemented. As the arc 124 moves downstream, the effect of the reaction is magnified relative to the size of the arc 124.

Eventually, the gap between the electrodes 122 becomes wide enough that the current ceases to flow between the electrodes 122. However, the ionized particles continue to move downstream under the influence of the mixture. Once the current stops flowing between the electrodes 122, the electrical potential increases on the electrodes 122 until the current arcs again, as shown in FIG. 3C, and the plasma generation process continues. Although much of the oxidation process may occur at the plasma generator 120 between the electrodes 122, the oxidation process may continue downstream from the plasma generator 120.

Figure 4:
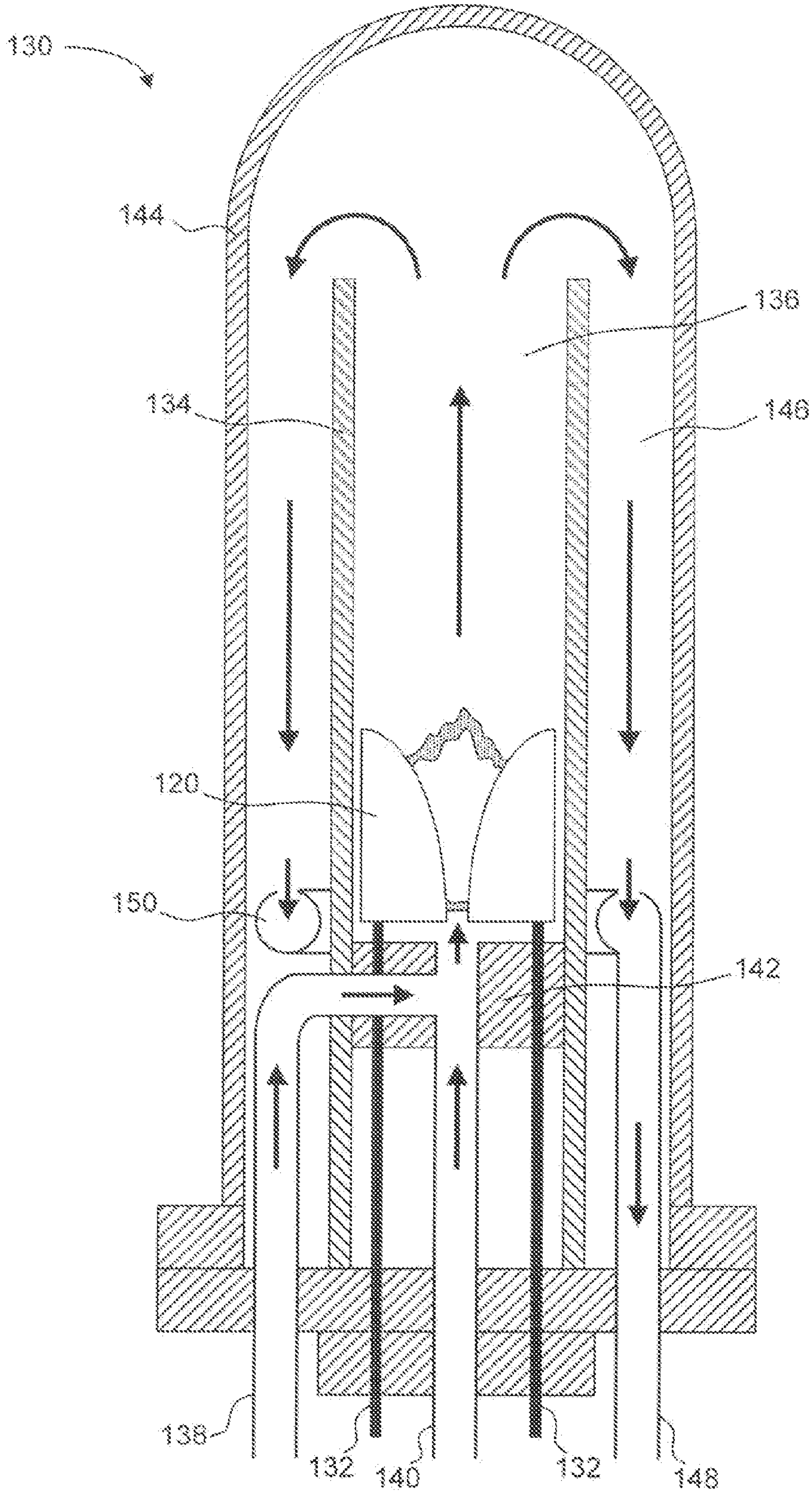
FIG. 4 illustrates a schematic diagram of another embodiment of the gliding electric arc oxidation system.

FIG. 4 illustrates a schematic diagram of another embodiment of the gliding electric arc oxidation system 130. The illustrated gliding electric arc oxidation system 130 includes a plasma generator 120. Each of the electrodes 122 of the plasma generator 120 is connected to an electrical conductor 132. The plasma generator 120 is located within a housing 134. In one embodiment, the housing 134 defines a channel 136 downstream of the plasma generator 120 so that the reactants may continue to react and form the oxidation product downstream of the plasma generator 120. The housing 134 may be fabricated of a conductive or non-conductive material. In either case, an electrically insulated region may be provided around the plasma generator 120. In one embodiment, the housing 134 is fabricated from a non-conductive material such as an alumina ceramic to prevent electricity from discharging from the plasma generator 120 to surrounding conductive components.

In order to introduce the combustible material and the oxidizer into the plasma generator 120, the gliding electric arc oxidation system 130 includes multiple channels, or conduits. In the illustrated embodiment, the gliding electric arc oxidation system 130 includes a first channel 138 for the combustible material and a second channel 140 for the oxidizer. The first and second channels 138 and 140 join at a mixing manifold 142, which facilitates premixing of the combustible material and the oxidizer. In other embodiments, the combustible material and the oxidizer may be introduced separately into the plasma generator 120. Additionally, the locations of the first and second channels 138 and 140 may be arranged in a different configuration.

In order to contain the reactants during the oxidation process, and to contain the oxidation product resulting from the oxidation process, the plasma generator 120 and the housing 134 may be placed within an outer shell 144. In one embodiment, the outer shell 144 facilitates heat transfer to and/or from the gliding electric arc oxidation system 130. Additionally, the outer shell 144 is fabricated from steel or another material having sufficient strength and stability at the operating temperatures of the gliding electric arc oxidation system 130.

In order to remove the oxidation product (e.g., including any carbon dioxide, steam, etc.) from the annular region 146 of the outer shell 144, the gliding electric arc oxidation system 130 includes an exhaust channel 148. In one embodiment, the exhaust channel is coupled to a collector ring manifold 150 that circumscribes the housing 134 and has one or more openings to allow the oxidation product to flow to the exhaust channel 148. In the illustrated embodiment, the oxidation product is exhausted out the exhaust channel 148 at approximately the same end as the intake channels 138 and 140 for the combustible material and the oxidizer. This configuration may facilitate easy maintenance of the gliding electric arc oxidizer system 130 since all of the inlet, outlet, and electrical connections are in about the same place. Other embodiments of the gliding electric arc oxidation system 130 may have alternative configurations to exhaust the oxidation products from the outer shell 144.

Figure 5:
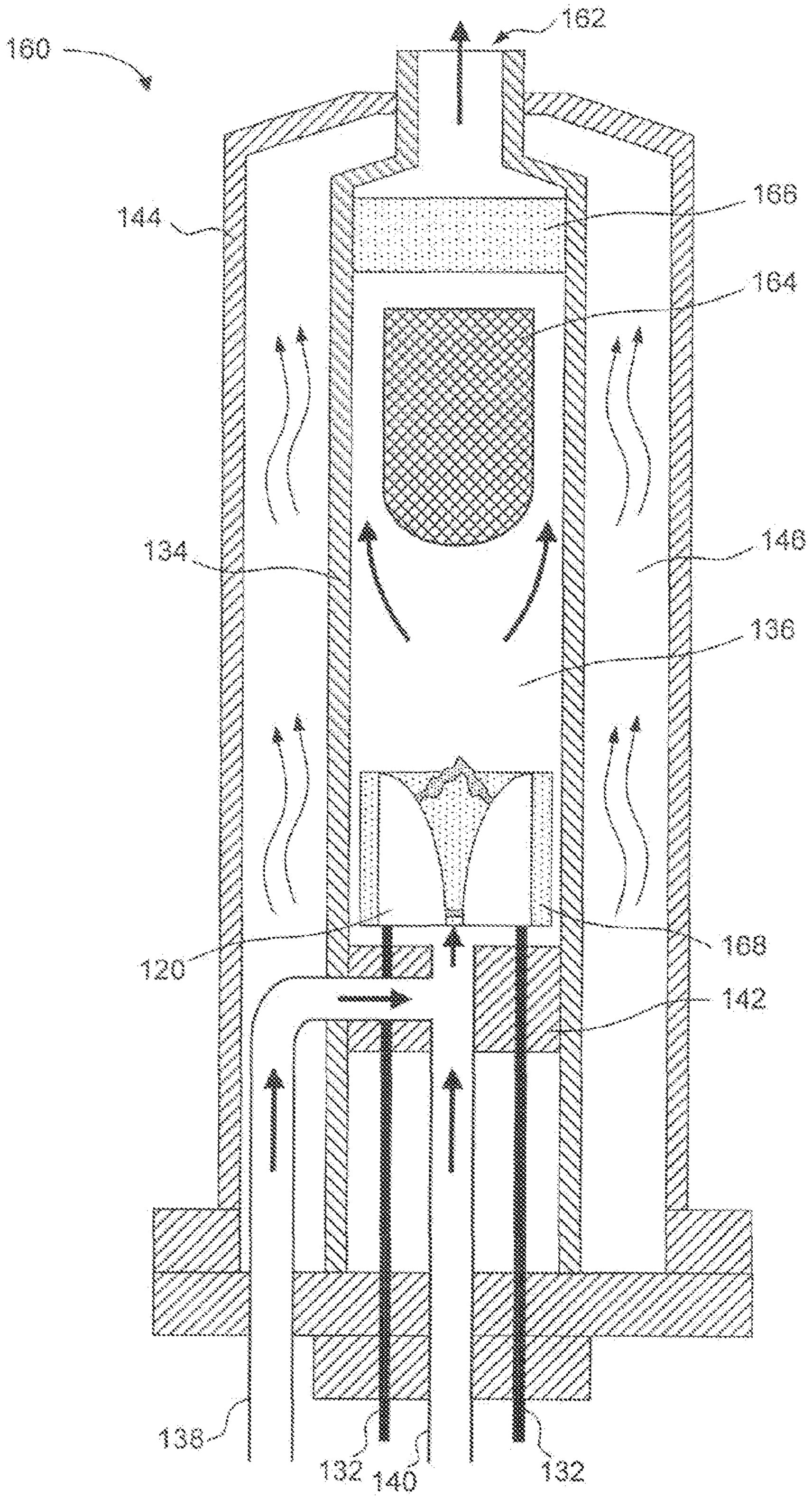
FIG. 5 illustrates a schematic diagram of another embodiment of the gliding electric arc oxidation system.

FIG. 5 illustrates a schematic diagram of another embodiment of the gliding electric arc oxidation system 160. Although many aspects of the gliding electric arc oxidation system 160 of FIG. 5 are substantially similar to the gliding electric arc oxidation system 130 of FIG. 4, the gliding electric arc oxidation system 160 is different in that it allows pass-through exhaustion of the oxidation product through an exhaust outlet 162 at approximately the opposite end of the gliding electric arc oxidation system 160 from the intake channels 138 and 140 for the combustible material and the oxidizer. In one embodiment, the oxidation product passes directly through the channel 136 of the housing 134 and out through the exhaust outlet 162, instead of passing into the annular region 146 of the outer shell 144.

The illustrated gliding electric arc oxidation system 160 of FIG. 5 also includes some additional distinctions from the gliding electric arc oxidation system 130 of FIG. 4. In particular, the gliding electric arc oxidation system 160 includes a diversion plug 164 located within the housing 134 to divert the reactants and oxidation product outward toward the interior surface of a wall of the housing 134. Since the oxidation process is exothermic, the diversion plug 164 forces the flow toward the wall of the housing 134 to facilitate heat transfer from the oxidation product to the wall of the housing 134. In one embodiment, the diversion plug 164 is fabricated from a ceramic material or another material that is stable at high temperatures.

In addition to the heat transfer from the oxidation product to the wall of the housing 134, the gliding electric arc oxidation system 160 also may facilitate heat transfer away from the housing 134 by flowing a coolant through the annular region 146 of the outer shell 144. The coolant may be a gas or a liquid. For example, the coolant may be air. Although not shown in detail, the coolant may be circulated within or exhausted from the outer shell 144.

The illustrated gliding electric arc oxidation system 160 also includes a homogenization material 166 located in the channel 136 of the housing 134. The homogenization material 166 serves one or more of a variety of functions. In some embodiments, the homogenization material 166 facilitates homogenization of the oxidation product by transferring oxygen from the oxidizer to the combustible material. In some embodiments, the homogenization material 166 also provides both spatial and temporal mixing of the reactants to help the reaction continue to completion. In some embodiments, the homogenization material 166 also facilitates equilibration of gas species. In some embodiments, the homogenization material 166 also facilitates heat transfer, for example, from the oxidation product to the homogenization material 166 and from the homogenization material 166 to the housing 134. In some embodiments, the homogenization material 166 may provide additional functionality.

The illustrated gliding electric arc oxidation system 160 also includes a ceramic insulator 168 to electrically insulate the electrodes 122 from the housing 134. Alternatively, the gliding electric arc oxidation system 160 may include an air gap between the electrodes 122 and the housing 134. While the dimensions of the air gap may vary in different implementations depending on the operating electrical properties and the fabrication materials used, the air gap should be sufficient to provide electrical isolation between the electrodes 122 and the housing 134 so that electrical current does not arc from the electrodes 122 to the housing 134.

Figure 6A:
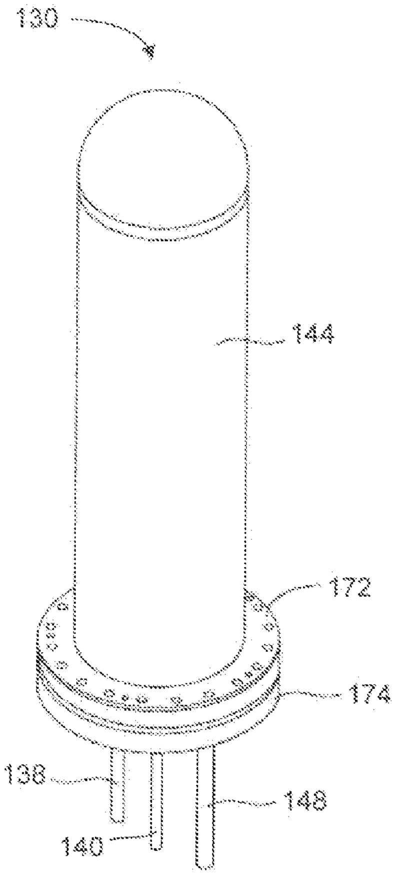
FIGS. 6A-C illustrate schematic diagrams of various perspective views of the gliding electric arc oxidation system of FIG. 4.
Figure 6B:
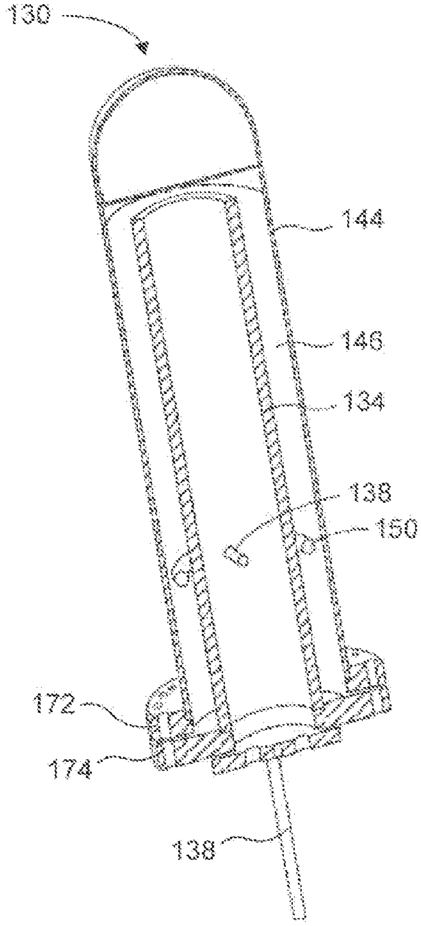
Figure 6C:
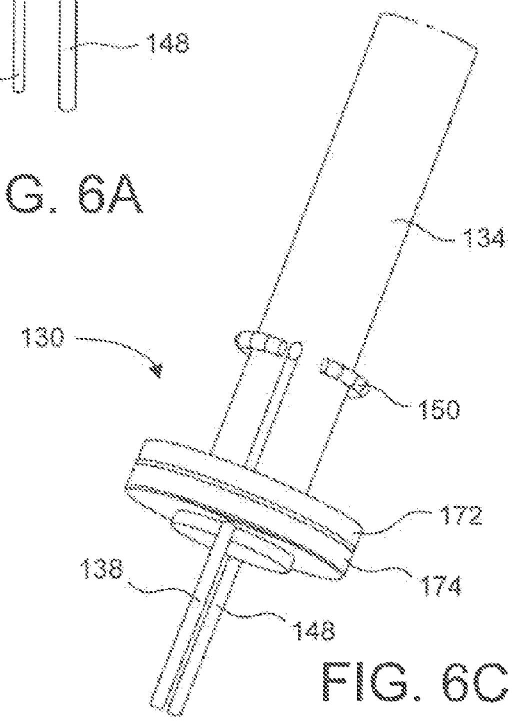

FIGS. 6A-C illustrate schematic diagrams of various perspective views of the gliding electric arc oxidation system of FIG. 4. In particular, FIG. 6A illustrates the outer shell 144 having a flange 172 mountable to a furnace or other surface. A second flange 174 may be attached to many of at least some of the internal components described above, allowing the internal components to be removed from the outer shell 144 without removing or detaching the outer shell 144 from a mounted position. The channels 138 and 140 for the combustible material and the oxidizer and the exhaust channel 148 are also indicated. FIG. 6B shows a cutaway view of the outer shell 144, the housing 134, the channel 138 (the channels 140 and 148 are not shown), the collector ring manifold 150, and the flanges 172 and 174. FIG. 6C also shows the housing 134, the channels 138 and 148 (the channel 140 is not shown), the collector ring manifold 150, and the flanges 172 and 174.

Figure 7A:
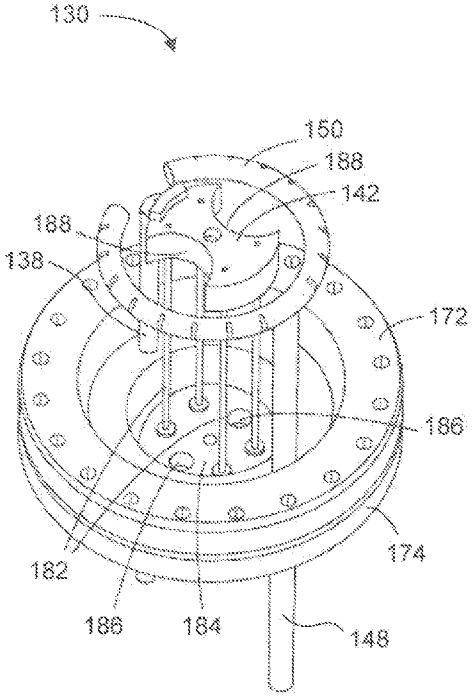
FIGS. 7A and 7B illustrate schematic diagrams of additional perspective views of the gliding electric arc oxidation system of FIG. 4.
Figure 7B:
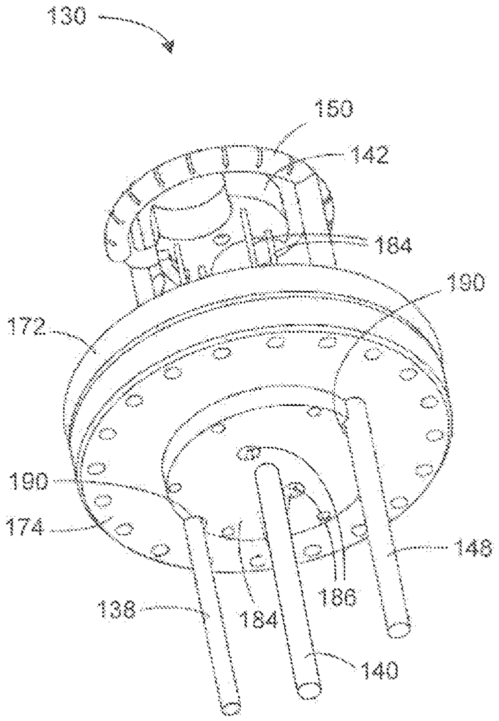

FIGS. 7A and 7B illustrate schematic diagrams of additional perspective views of the gliding electric arc oxidation system 130 of FIG. 4. In particular, FIGS. 7A and 7B illustrate embodiments of the channels 138 and 140, the exhaust channel 148, the mixing manifold 142, the collector ring manifold 150, and the flanges 172 and 174. Additionally, the gliding electric arc oxidation system 130 includes several support bars 182 connected to a bottom mounting plate 184 to support the mixing manifold 142. In one embodiment, the bottom mounting plate 184 includes apertures 186 to accommodate the electrical conductors 132. In some embodiments, the electrical conductors 132 also provide structural support for the electrodes 122 to which they are connected. For example, the electrical conductors 132 may pass through cutout regions 188 defined by the mixing manifold 142, without touching the mixing manifold 142, to support the electrodes 122 at a distance from the mixing manifold 142. In one embodiment, the conductors 312 are surrounded by electrical insulators at the apertures 186 to prevent electricity from discharging to the bottom mounting plate 184.

In some embodiments, the bottom mounting plate 184 may be removed from the flanges 172 and 174 to remove the mixing manifold 142 and the electrodes 122 from the housing 134 and the outer shell 144. Additionally, in some embodiments, one or more notches 190 are formed in the bottom mounting plate 184 to facilitate proper alignment of the mixing manifold 142 with the channels 138 and 140.

Figure 8A:
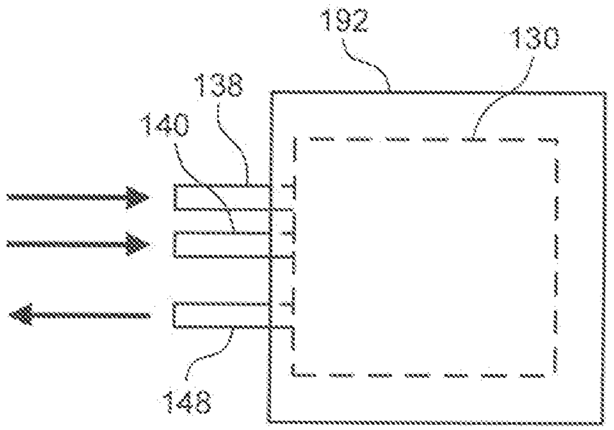
FIG. 8A illustrates a schematic block diagram of an embodiment of the gliding electric arc oxidation system of FIG. 4 within a furnace.
Figure 8B:
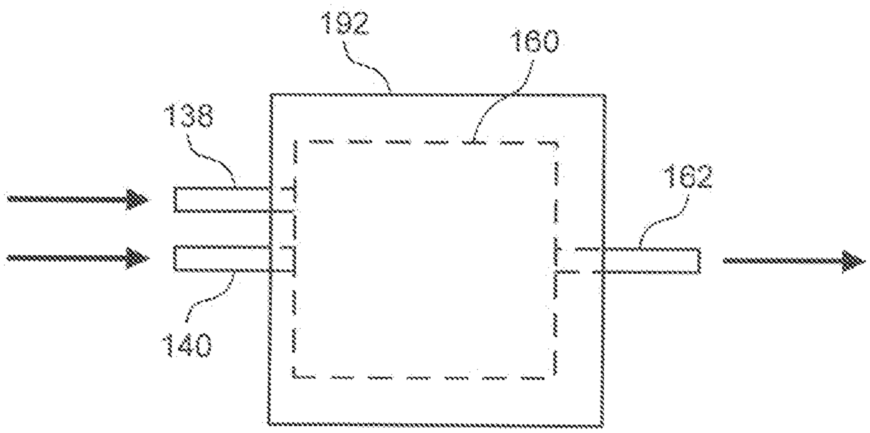
FIG. 8B illustrates a schematic block diagram of an embodiment of the gliding electric arc oxidation system of FIG. 5 within a furnace.

FIG. 8A illustrates a schematic block diagram of an embodiment of the gliding electric arc oxidation system 130 of FIG. 4 within a furnace 192. Similarly, FIG. 8B illustrates a schematic block diagram of an embodiment of the gliding electric arc oxidation system 160 of FIG. 5 within a furnace 192. As explained above, it may be useful to mount embodiments of the gliding electric arc oxidation systems 130 and 160 inside a furnace 192 to maintain the gliding electric arc oxidation systems 130 and 160 at a temperature within a particular operating temperature.

As an example of operation of an embodiment of the gliding electric arc oxidation system 130, a gas composition containing 35% hydrogen, 30% carbon monoxide, 20% nitrogen, 5% methane, and 8% carbon dioxide may be used as a combustible material. This gas composition is representative of at least some incineration products resulting from chemical munitions explosions.

In one embodiment, the gliding electric arc oxidation system 130 is initially heated by introducing a mixture of a gaseous hydrocarbon and air. Exemplary gaseous hydrocarbons include natural gas, liquefied petroleum gas (LPG), propane, methane, and butane. Once the temperature of the gliding electric arc oxidation system 130 reaches an operating temperature of about 800° C., the flow of the gaseous hydrocarbon is turned off and raw gas is introduced. The flow rates of air and raw gas are adjusted to maintain proper stoichiometric ratio, while the total flow is adjusted to maintain the plasma generator 120 at a particular operating temperature or within an operating temperature range.

As an alternative, oxygen may be used instead of air in order to lower the overall volume of oxidized gas. Additionally, air may be used to cool the gliding electric arc oxidation system 130 while oxygen is introduced with the combustible material to fully oxidize the combustible material.

Reference throughout this specification to "one embodiment," "an embodiment," or similar language means that the described feature, operation, structure, or characteristic may be implemented in at least one embodiment. Thus, the phrases "in one embodiment," "in an embodiment," and similar phrases throughout this specification may, but do not necessarily, refer to the same embodiment.

Furthermore, the described features, operations, structures, or characteristics of the described embodiments may be combined in any suitable manner. Hence, the numerous details provided here, such as examples of electrode configurations, housing configurations, substrate configurations, channel configurations, catalyst configurations, and so forth, provide an understanding of several embodiments of the invention. However, some embodiments may be practiced without one or more of the specific details, or with other features operations, components, materials, and so forth. In other instances, well-known structures, materials, or operations are not shown or described in at least some of the figures for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for oxidizing a combustible material, the method comprising:
- introducing a volume of the combustible material into a plasma zone of a gliding electric arc oxidation system;
- introducing a volume of oxidizer into the plasma zone of the gliding electric arc oxidation system, wherein the volume of oxidizer comprises a stoichiometrically excessive amount of oxygen, wherein the stoichiometrically excessive amount of oxygen comprises at least approximately 5% more oxygen than is required to oxidize the combustible material; and
- generating an electrical discharge between electrodes within the plasma zone of the gliding electric arc oxidation system to oxidize the combustible material.

2. The method of claim 1, wherein the stoichiometrically excessive amount of oxygen comprises approximately 5-100% more oxygen than is required to oxidize the combustible material.

3. The method of claim 1, wherein the oxidizer comprises air.

4. The method of claim 1, wherein the oxidizer comprises oxygen.

5. The method of claim 1, wherein the oxidizer comprises steam.

6. The method of claim 1, wherein the combustible material comprises a composition of liquid, gaseous, or solid combustible material.

7. The method of claim 1, wherein the combustible material comprises a hydrocarbon.

8. The method of claim 1, wherein the combustible material comprises a solid comprising primarily carbon.

9. The method of claim 1, further comprising creating a mixture of the combustible material and a carrier material, wherein introducing the volume of the combustible material into the plasma zone of the gliding electric arc oxidation system comprises introducing the mixture of the combustible material and the carrier material into the plasma zone of the gliding electric arc oxidation system.

10. The method of claim 1, further comprising controlling a flow of the oxidizer into the plasma zone of the gliding electric arc oxidation system to adjust the stoichiometrically excessive amount of oxygen.

11. The method of claim 1, further comprising:
- premixing a mixture of the volume of combustible material and the volume of oxidizer outside of the plasma zone of the gliding electric arc oxidation system; and introducing the mixture of the volume of combustible material and the volume of oxidizer into the plasma zone of the gliding electric arc oxidation system.

12. The method of claim 1, further comprising preheating the gliding electric arc oxidation system to an operating temperature within an operating temperature range prior to introducing the volume of combustible material and the volume of oxidizer into the plasma zone of the gliding electric arc oxidation system.

13. The method of claim 12, further comprising maintaining the operating temperature of the gliding electric arc oxidation system within the operating temperature range, wherein the operating temperature range is approximately 700 ° C. to 1,000 ° C., wherein maintaining the operating temperature comprises:

controlling flow rates of the volume of combustible material and the volume of oxidizer into the plasma zone of the gliding electric arc oxidation system; and controlling flow ratios of the volume of combustible material to the volume of oxidizer into the plasma zone of the gliding electric arc oxidation system.

14. The method of claim 1, further comprising directing an oxidation product, resulting from oxidation of the combustible material, from the plasma zone to a homogenization zone, the homogenization zone comprising a homogenization material to at least partially homogenize the oxidation product, wherein the oxidation product is a material other than a solid material.

15. The method of claim 14, wherein the oxidation product comprises a liquid material.

16. The method of claim 14, wherein the oxidation product comprises a gaseous material.

17. The method of claim 1, further comprising quenching a solid oxidation product, the solid oxidation product resulting from oxidation of the combustible material.

18. The method of claim 1, further comprising directing an oxidation product, resulting from oxidation of the combustible material, from the plasma zone to a heat transfer zone, the heat transfer zone comprising a diversion plug to direct the oxidation product toward an interior surface of an outer wall of a housing for heat transfer from the oxidation product to the outer wall of the housing.

19. The method of claim 18, further comprising flowing a coolant over an outer surface of the outer wall of the housing for heat transfer from the outer wall of the housing to the coolant.

20. The method of claim 1, further comprising:

fully oxidizing the combustible material to generate an oxidation product, wherein the oxidation product is substantially free from carbon monoxide and nitrogen oxide; and outputting the oxidation oproduct from the gliding electric arc oxidation system.

* * * * *